Aug. 10, 1937.　　　　E. R. ALLING　　　　2,089,592
CONVEYING MEANS
Filed April 15, 1935
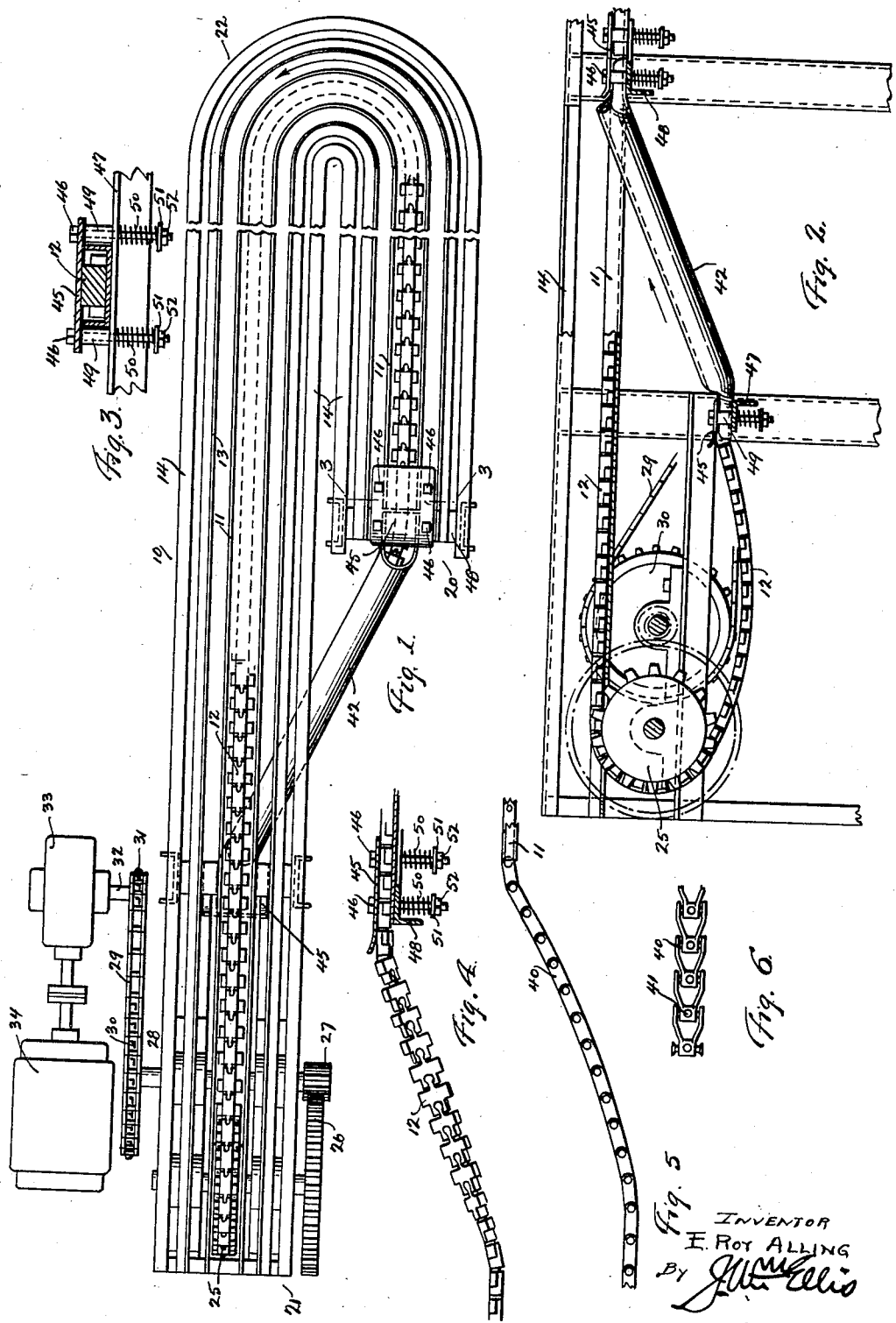

Patented Aug. 10, 1937

2,089,592

UNITED STATES PATENT OFFICE 2,089,592

CONVEYING MEANS

E. Roy Alling, Kenmore, N. Y.

Application April 15, 1935, Serial No. 16,310

3 Claims. (Cl. 198—189)

My invention relates in general to conveyors, and more particularly to that type of conveyor used to carry cans, cases, bottles, or packages of merchandise.

It is well known to those skilled in the art that in conveying machinery of this class the upper pass of the conveyor chain is extended over suitable tracks forming a conveyor table and around the path in which it is desired to convey the objects. The lower pass of the chain is then returned to the start of its load-carrying position by being passed over substantially the same course through which it has been passed in its load-carrying travel. When the conveyor table is formed with curves or bends in its working face, this practice not only requires twice as much chain as is in active service but also requires considerable additional power to operate the chain.

One of the principal objects of my invention has been to provide conveying means so constructed that in installations where the conveyor table is provided with curves the conveyor chain may be passed directly from the discharging or unloading end of a conveyor table to the charging or loading end thereof which in such installations is a shorter distance than the length of the working face of the table, thus using only a single upper pass of the chain in order to perform the entire conveying functions.

Other objects of my invention have been to greatly reduce the number of parts necessary for conveying objects any given length, and also to simplify the installation, operation, and maintenance of conveying means and thus reduce the cost of manufacturing and the power necessary to operate the same.

In the accompanying drawing, I have shown one form of apparatus and two types of chain, whereby my invention may be carried out, it being obvious that these are merely illustrated forms. In the drawing:

Fig. 1 is a plan view of a conveyor.

Fig. 2 is a fragmentary, sectional, side elevation thereof.

Fig. 3 is an enlarged, sectional view of one of the safety plates of my device and is taken on line 3—3 of Fig. 1.

Fig. 4 is a fragmentary side elevation showing one type of chain being used.

Fig. 5 is a similar view showing another type of chain.

Fig. 6 is a fragmentary plan view showing the type of chain illustrated in Fig. 5.

As shown in the drawing, 10 represents the conveyor table of the usual type which is provided with a channel-shaped track 11 for the guidance of the conveyor chain 12 and the usual support 13 arranged at each side of the channel-shaped track. The usual guide rails 14 are also shown.

It will be clear that my invention is only applicable and valuable in installations where the conveyor table is so formed that the direct distance across the table between the loading end and the discharge end is less than the distance between these ends when measured on the working face of the table.

As hereinbefore stated, the conveying apparatus shown in the drawing is merely illustrative of many types of such apparatus to which my invention may be applied. In the form shown, 20 represents the loading end of the conveyor, and 21 the unloading end thereof. This conveyor is shown broken and may continue for many feet in a straight direction or have any number of turns, as is well known. A single return bend 22 is shown. The apparatus is provided with the customary head sprocket 25 over which the chain 12 passes, and by which it is propelled. This sprocket may be driven by spur gears 26 and 27 through the medium of a shaft 28 and sprocket chain 29. The sprocket chain connects a suitable sprocket wheel 30 carried by the shaft 28, with a sprocket wheel 31 carried by the shaft 32 of a well known type of gear reduction unit 33. The driving motor is represented at 34.

The chain 12 employed in the carrying out of my invention may be of a number of different types. In Fig. 4 I show a ball and socket type link which is capable of universal movement as well as of twisting or semi-rotational movement. In Figs. 5 and 6 I show a type of chain, the links 40 of which are connected by means of universal joints 41. In this type of chain either side may be used as the load-conveying surface and, therefore, it is not necessary, in the carrying out of my method to be able to twist this chain.

As shown in Figs. 1 and 2, after the chain 12 has engaged the head sprocket 25 it is passed under the load-carrying path of the chain for a short distance and then is conducted upwardly and across to the load-carrying end 20 of the conveyor table where it is again put into service. As shown in the drawing, a guide 42 is employed for supporting and guiding this portion of the chain as it is returned to the loading end of the conveyor table. This guide may be in the form of a tube as shown or it may be in the form of a trough (not shown). The lower end of the guide is connected to the table structure in such a position as to receive the return or lower pass of the chain and to conduct it upwardly to the loading end 20 where it is also secured in place in registration with the channel-shaped track 11.

Obviously, the chain in its passage over the head sprocket 25 is inverted, and in the type of chain shown in Figs. 5 and 6, where either side may be used as the load-carrying surface, the chain is conducted in such inverted position and fed along in the chain-carrying path at the beginning of the load-carrying travel. Where, however, both sides of the chain cannot be used as a load-supporting surface, as is the case in a ball and socket type link as shown in Fig. 4, it is necessary that the chain be given a 180° twist so as to bring the load-supporting surface thereof, from a reversed position (which it assumes as a result of its passage over the head sprocket 25) to its normal load-carrying position. This twist in the chain is maintained only during its passage through the guide 42. Where such a chain as shown in Fig. 4 is employed, it is desirable that suitable hold-down or retaining means to be employed, such as, for instance, a safety plate 45 carried at each end of the guide or at the place where the twist starts and where it is finished. Each of these plates, as clearly shown by the enlarged view in Fig. 3, is mounted upon two bolts 46 which pass through the plate and through the support 47 or 48. Suitable spacers 49 are placed about the bolts and are arranged between the bottom of each plate and the top of the support, whereby the plate will be held in spaced relation with the support and will permit the free passage of the chain thereunder. Suitable helical springs 50 are placed about the lower ends of the bolts where a washer 51 and nut 52 is provided. The plates are thus yieldably held against the spacers 49 so that should the chain, for any reason, become caught or jammed underneath the plate, the plate will move upwardly against the tension of the springs and thus allow the chain to pass without any damage to the mechanism. The chain in passing from the lower return level to the upper conveying level will naturally assume its correct position, owing to the weight of the chain, and will be in correct conveying position when it reaches the beginning of its load-carrying travel. The safety plates are provided merely as auxiliary means to insure that the chain will be kept in its proper position. While I have shown a guide 42 for supporting the twisted portion of the chain, obviously, such a guide, or a trough is not essential since this portion of the chain can be freely suspended between the two supports 47 and 48.

When the chain of my invention is assembled, it is given an initial twist of 180° and the ends are then fastened together. After the chain is given such initial twist, the twist will be maintained in the chain and will be confined between the supports 47 and 48 as it is being moved through its course of travel.

Having thus described my invention, what I claim is:

1. Conveying means, comprising a conveyor table, having a loading end and a discharge end, said table being so formed that the shortest distance between the loading end and the discharge end is less than the length of the working face of the table, a conveyor chain having a substantially flat load-carrying surface and being so arranged as to provide a load-carrying pass extending substantially the length of the working face of the table and a return pass extending across the table substantially from the discharge end to the loading end, track means carried by the table for supporting the load-carrying pass of the chain, safety plates carried by the table and arranged one at each end of the return pass of the chain, and means for resiliently holding each of said plates in position for maintaining the chain in desired predetermined position.

2. Conveying means, comprising a conveyor table, having a loading end and a discharge end, said table being so formed that the shortest distance between the loading end and the discharge end is less than the length of the working face of the table, a conveyor chain having a substantially flat load-carrying surface and being so arranged as to provide a load-carrying pass extending substantially the length of the working face of the table and a return pass extending across the table substantially from the discharge end to the loading end, track means carried by the table for supporting the load-carrying pass of the chain, a guide carried by the table for supporting the return pass of the chain, safety plates carried by the table and arranged one at each end of the guide for maintaining the chain in desired predetermined positions, and resilient means for holding the plates in position.

3. Conveying means, comprising a conveyor table, having a load end and a discharge end, said table being so formed that the shortest distance between the loading end and the discharge end is less than the length of the working face of the table, a conveyor chain having a substantially flat load-carrying surface and being so arranged as to provide a load-carrying pass extending substantially the length of the working face of the table and a return pass extending across the table substantially from the discharge end to the loading end, said return pass being twisted so as to bring and maintain the load-carrying surface uppermost at each end of the table, track means carried by the table for supporting the load-carrying pass of the chain, and retaining means carried by the table and arranged at each end of the return pass of the chain, said retaining means being engageable with two opposite sides of the chain for maintaining the axial twist of such return pass.

E. ROY ALLING.